United States Patent
Mavor et al.

(10) Patent No.: US 10,142,288 B1
(45) Date of Patent: Nov. 27, 2018

(54) MACHINE APPLICATION INTERFACE TO INFLUENCE VIRTUAL ENVIRONMENT

(71) Applicant: Envelop VR, Bellevue, WA (US)

(72) Inventors: Jonathan Mavor, Bellevue, WA (US); Steve Smith, Bellevue, WA (US)

(73) Assignee: MADRONA VENTURE FUND VI, L.P, Seattle, WA (US)

( * ) Notice: Subject to any disclaimer, the term of this patent is extended or adjusted under 35 U.S.C. 154(b) by 214 days.

(21) Appl. No.: 15/257,685

(22) Filed: Sep. 6, 2016

Related U.S. Application Data

(60) Provisional application No. 62/214,503, filed on Sep. 4, 2015.

(51) Int. Cl.
| | |
|---|---|
| *H04L 29/06* | (2006.01) |
| *G06F 17/30* | (2006.01) |
| *G06T 19/20* | (2011.01) |
| *G06T 19/00* | (2011.01) |

(52) U.S. Cl.
CPC .... *H04L 63/0236* (2013.01); *G06F 17/30371* (2013.01); *G06T 19/006* (2013.01); *G06T 19/20* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2009/0106671 A1* | 4/2009 | Olson | ............... | G06F 17/30041 715/757 |
| 2009/0141023 A1* | 6/2009 | Shuster | ............... | G06T 3/40 345/419 |
| 2012/0256917 A1* | 10/2012 | Lieberman | ............... | G06T 17/05 345/419 |
| 2012/0299915 A1* | 11/2012 | Eluard | ............... | G09C 5/00 345/420 |
| 2013/0135303 A1* | 5/2013 | Densham | ............... | G06T 17/00 345/420 |
| 2015/0032766 A1* | 1/2015 | Greenbaum | ............... | G06F 17/30061 707/756 |
| 2015/0229645 A1* | 8/2015 | Keith | ............... | H04L 41/50 726/4 |
| 2016/0234475 A1* | 8/2016 | Courchesne | ............... | H04N 7/157 |
| 2016/0292966 A1* | 10/2016 | Denham | ............... | G06Q 30/0633 |
| 2017/0039829 A1* | 2/2017 | Kerzner | ............... | G08B 13/19645 |
| 2017/0237965 A1* | 8/2017 | Wang | ............... | H04N 13/0055 348/42 |
| 2017/0351909 A1* | 12/2017 | Kaehler | ............... | G06K 9/00281 |

\* cited by examiner

*Primary Examiner* — Kaveh Abrishamkar
(74) *Attorney, Agent, or Firm* — FSP LLC

(57) ABSTRACT

A method and system for influencing a virtual environment establishes a machine application interface which utilizes an application interaction layer to allow multitasking of applications within a single virtual environment, the method and system also allow for the use of two-dimensional legacy applications within the virtual environment. The method and system receives requests from outside applications and mediates control of spaces within the virtual environment depending on the user's security preferences.

20 Claims, 5 Drawing Sheets

US 10,142,288 B1

MACHINE APPLICATION INTERFACE TO INFLUENCE VIRTUAL ENVIRONMENT

CROSS-REFERENCE TO RELATED APPLICATIONS

This application claims benefit under 35 U.S.C. 119 to U.S. application Ser. No. 62/214,503, filed on Sep. 4, 2015, and incorporated herein by reference in its entirety.

BACKGROUND

Virtual reality allows people to interact with objects in a three dimensional virtual space. Currently, most virtual reality applications restrict the user to one encapsulated virtual environment, preventing the user from accessing other applications while the environment is running. For instance, if a user wants to play a virtual reality game, that game consumes the entire virtual environment to the exclusion of other applications. A user can not simultaneously perform one task in virtual reality and interact with another legacy application at the same time. This problem arises due to the fact that virtual reality applications do not have an easy way to multitask or interact with one another or legacy applications within a single virtual environment.

This is traditionally an area where virtual reality has lagged behind standard methods of computer interaction. In standard non-immersive two-dimensional computer-user interaction, a user can multitask with multiple applications and may do so with multiple displays. There are unique challenges which have prevented usable application multitasking and interaction from occurring within virtual reality, however.

In traditional event-driven computing, objects may be rendered and repainted at a certain frequency; this creates problems standardizing refresh rates of applications. Improper or inconsistent refresh rates can detract from the continuity of the experience and can lead to adverse physical effects for the user. Additionally, running multiple programs in the same virtual environment with a traditional event-driven architecture and communication leads to problems where the environment "hangs" while waiting for additional information from the sending program. This makes a traditional event-driven architecture and means of communication between applications unfeasible.

There are also unique security risks associated with attempting to multitask within a virtual environment. In a traditional immersive application such as a game, there is often security to protect the integrity of the game from outside breach, but not security between different aspects of the application itself. Objects within the application may freely interact with other objects, which is generally not a problem because all of the objects within the application are instantiated by the application itself. In a virtual environment which allows access to itself and by outside applications, the applications may "step on" one another while attempting to have the virtual environment render objects and perform actions.

BRIEF SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

In one embodiment, a new layer of interaction is created for application interoperability between each other and a shared virtual environment. A security model manages access to this and allows the user to dictate which programs are allowed to access and manipulate the environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
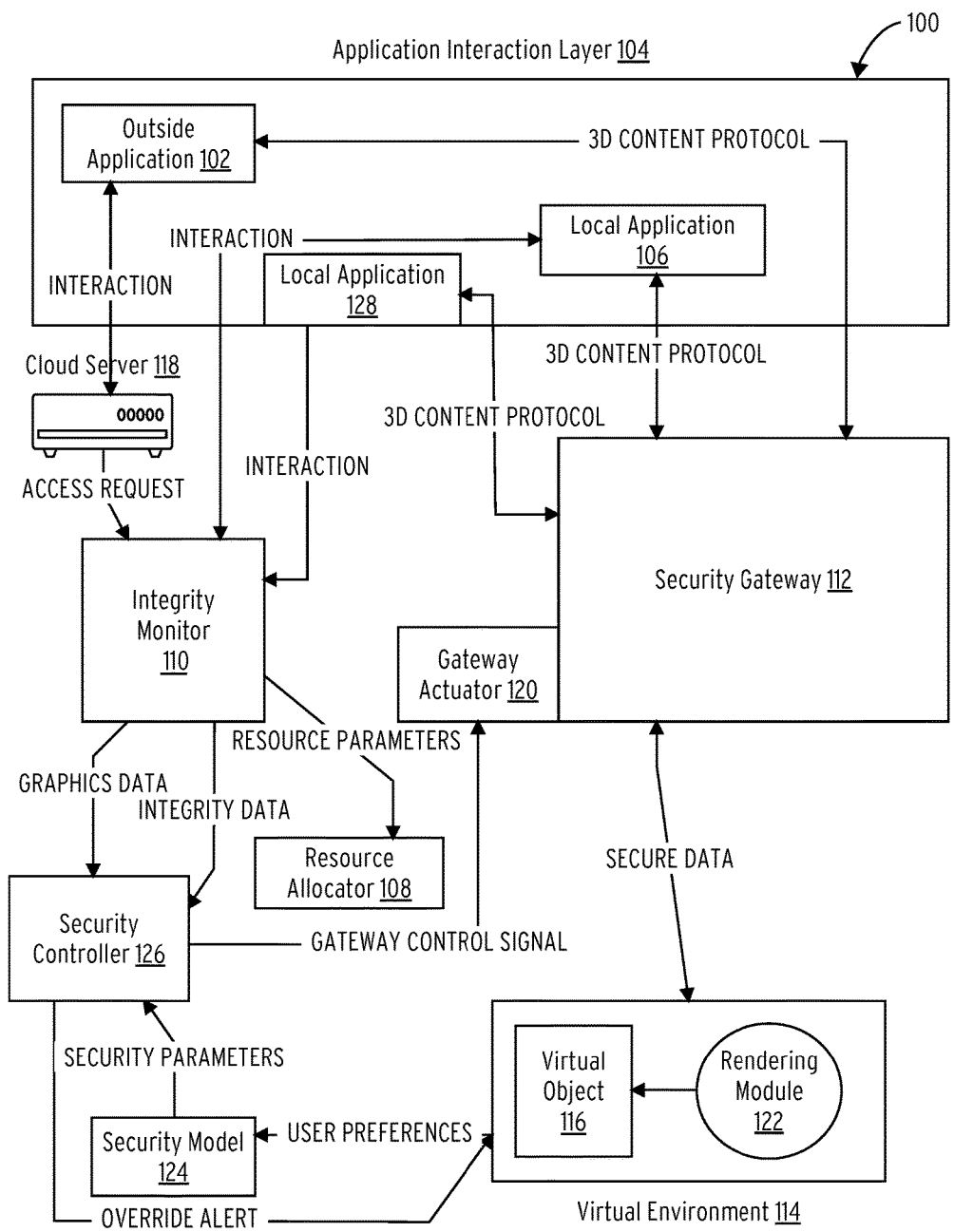
FIG. 1 illustrates a system for generating and operating a machine application interface for influencing a virtual environment 100 in accordance with one embodiment

Terms used herein should be given their conventional understanding in the relevant arts, unless otherwise defined as below:

"application" in this context refers to a computer program, script or subroutine.

"outside application" in this context refers to an application separate from the personal virtual environment, including local and external applications, for example, web-based applications.

"frame rate" in this context refers to the rate at which an imaging device displays consecutive images called frames. Frame rate is generally expressed in frames per second (FPS)

"graphics data" in this context refers to external application data which may show the graphics requirements of an application.

"graphics parameters" in this context refers to requirements based on system, personal virtual environment and application specifications for the proper rendering and use of objects within the virtual environment.

"integrity data" in this context refers to external application data which may affect the experiential and system integrity of the virtual environment.

"integrity parameters" in this context refers to requirements based on system, personal virtual environment and application specifications, which may be needed to maintain experiential and system integrity.

"interoperable" in this context refers to the ability of an application or environment to interact with multiple other applications simultaneously.

"interpolation" in this context refers to the means of constructing intervening data points between existing data points. Constructing new frames between existing frames to increase the effective frame rate of a video or other imaging content.

"legacy application" in this context refers to applications designed for use on a standard non-virtual reality systems "logic" in this context refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"rendering cost" in this context refers to the amount of computer resources and time needed to render a given object. This may be calculated by means such as counting the number of vertices and polygons.

"rendering module" in this context refers to logic to render 3D geometry within a 3D virtual space.

"shared virtual environment" in this context refers to an immersive three-dimensional digital environment or image that can be interacted with in a seemingly physical manner.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein.

The current method of using virtual reality restricts the user to one encapsulated virtual environment (VE) which is generally unable to access other applications while the VE is running. This system creates a VE capable of accepting external applications, allowing them to access the VE and be extended into virtual reality (VR). The system accomplishes this by establishing a local VE and an application interaction layer to securely facilitate connections between external applications and the VE, allowing external applications to plug into the VE and extend themselves into VR.

The machine-application interface's approach provides an advantage over both traditional computer interaction as well as current virtual reality methods, bringing traditional computing into the virtual space and allowing the user to use their computer fully in VR. Within the VE the user may interact with external virtual reality applications as well as legacy applications which may not, by themselves, be virtual reality capable. Applications may plug into this virtual environment and extend themselves into VR so that a user may use their computer as they normally would, (e.g. coding, web browsing, etc.) adding the functionality of virtual reality, without detracting from the standard computing experience. The machine-application interface may behave similar to a native operating system, or a hypervisor, and as such may be installed above, below, or parallel to the native operating system.

The machine-application interface may implement an application interaction layer to receive and mediate connections with external applications. External applications may interact with, extend, modify, and control the application interaction layer, enabling multitasking and interoperability, with multiple applications simultaneously running and interacting with a single VE In order to protect the integrity of the VE, the system may utilize a security model with the application interaction layer. The machine application interface may receive connections from web-based applications as well as applications installed locally. When utilizing websockets, the the system may utilize a local application to open up a web socket server which may validate the Application Programming Interface (API) version, origin and other properties, then create a new local application dedicated to the new remote client connection. An internal client implements the API in-process and queues up all of the API calls into a queue in an app-specific internal server. The internal server may maintain all resources and dependencies for that specific connection. So each outside application connects using its own instance of an individual internal client, internal server and websocket.

In some embodiments the virtual environment utilizes a security model to maintain the integrity of the virtual experience. Multiple applications attempting to utilize the same memory addresses or visual spaces could lead to undesired results, so in addition to keeping connections to the application interaction layer separate, the security model may also individually "silo" data structures, and threads to prevent these from directly accessing one-another. In one embodiment, based on the user's security preferences, the security logic operates a digital gateway to allow connections to be made to the virtual environment from a local application or internet-based applications. Whenever an application is interacting with the virtual environment it may only manipulate the VE to the degree specified by the user's security settings. At a high enough security level the VE will prevent external applications from performing any actions, unless the user confirms those actions.

In addition to mediating access with external applications, the machine-application interface may also maintain visual and system integrity. Visual integrity is an important aspect of virtual reality-based systems. If the frame-rate of an application is too low, the user can experience a reduction in comfort, and motion sickness, to the extent that the system may become unusable. This makes a traditional event-driven architecture and means of communication between applications unfeasible. The system may use an asynchronous bidirectional protocol to allow the application performance to be completely separate and asynchronous to the operating system performance. The API/Protocol construction allows the connection to be slow, while continuing to render at full performance at all times. For example if an application asks the system to create resources and then goes away, the system does not stall, because there is never a direct function call from the system or to the system that could stall. This prevents one side from "hanging" while waiting for an event to execute.

Once an application is connected to the virtual environment it can do things such as extend the web into the virtual environment or extend other applications in the virtual environment via a connection to the virtual environment e.g. TCP/IP. By way of example, when a user is previewing objects for e-commerce, the web page may communicate with the VE, add in objects and get input from the user.

FIG. 1 illustrates a system for generating and operating a machine application interface for influencing a virtual environment 100 in accordance with one embodiment The system comprises outside application 102, local application 106, local application 108, integrity monitor 110, application interaction layer 104, integrity monitor 110, security model 124, gateway actuator 120 virtual environment 114, virtual object 116. In one mode of operation, security controller receives a request signal from outside application 102 and in response integrity monitor 110 sends an alert to virtual environment 114. Integrity monitor 110 receives a user associated access control from virtual environment 114 and in response allows outside application 102 to interact with virtual environment 114. Integrity monitor 110 also receives a request signal from local application 106 and in response integrity monitor 110 sends an alert to virtual environment 114. Integrity monitor 110 receives a response from virtual environment 114 and in response allows local application 106 to interact with virtual object 116. Security gateway 112 receives secure data from the shared virtual environment and transmits the 3D content protocol to a local application 106. Security gateway 112 receives secure data from the shared virtual environment and transmits the 3D content protocol to an outside application 102.

Figure 4:
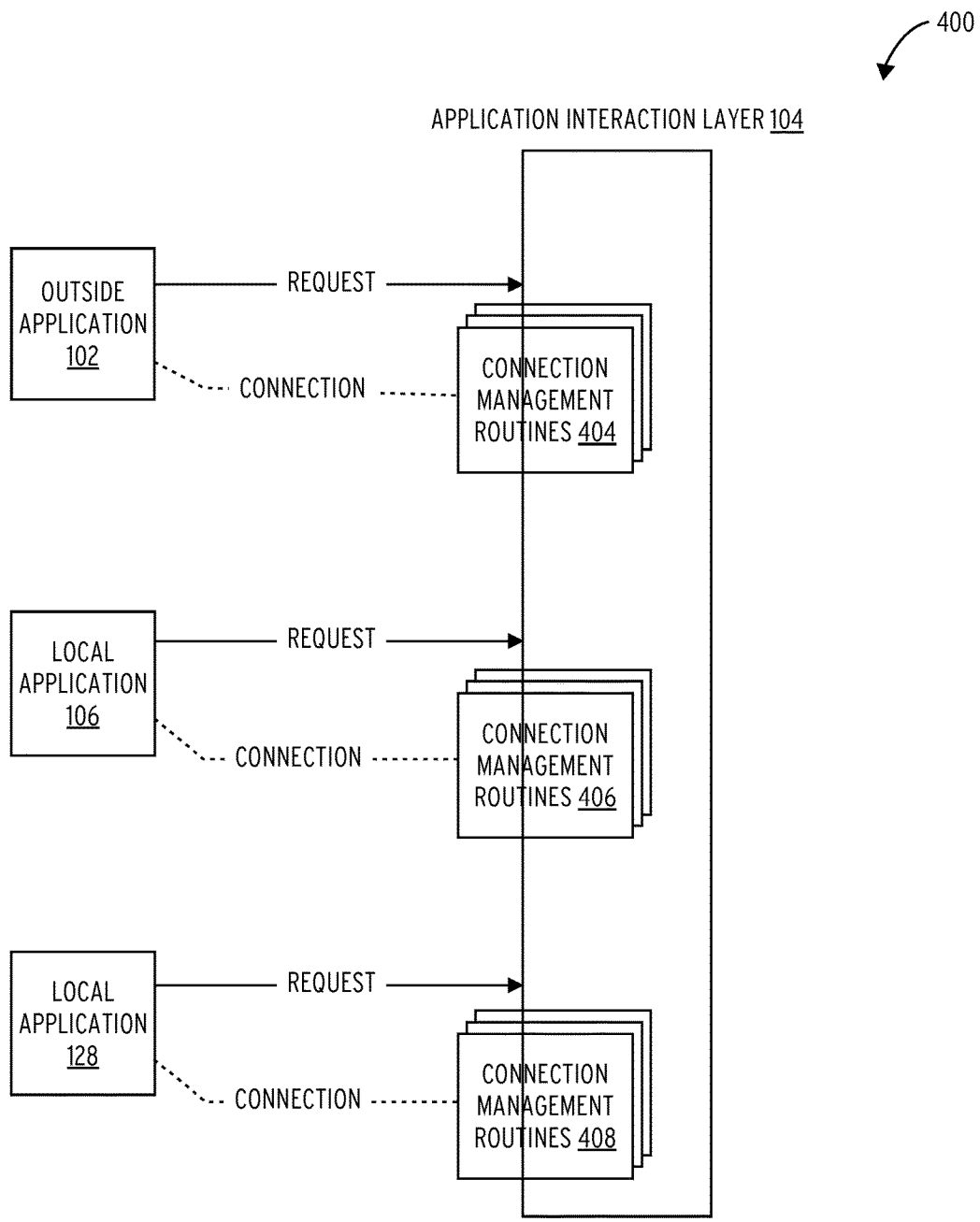
FIG. 4 illustrates an aspect of a system for generating and operating a machine application interface for influencing a virtual environment 400 in accordance with one embodiment.

The system for generating and operating a machine application interface for influencing a virtual environment 100 may be operated in accordance with the process described in FIG. 4.

Figure 2:
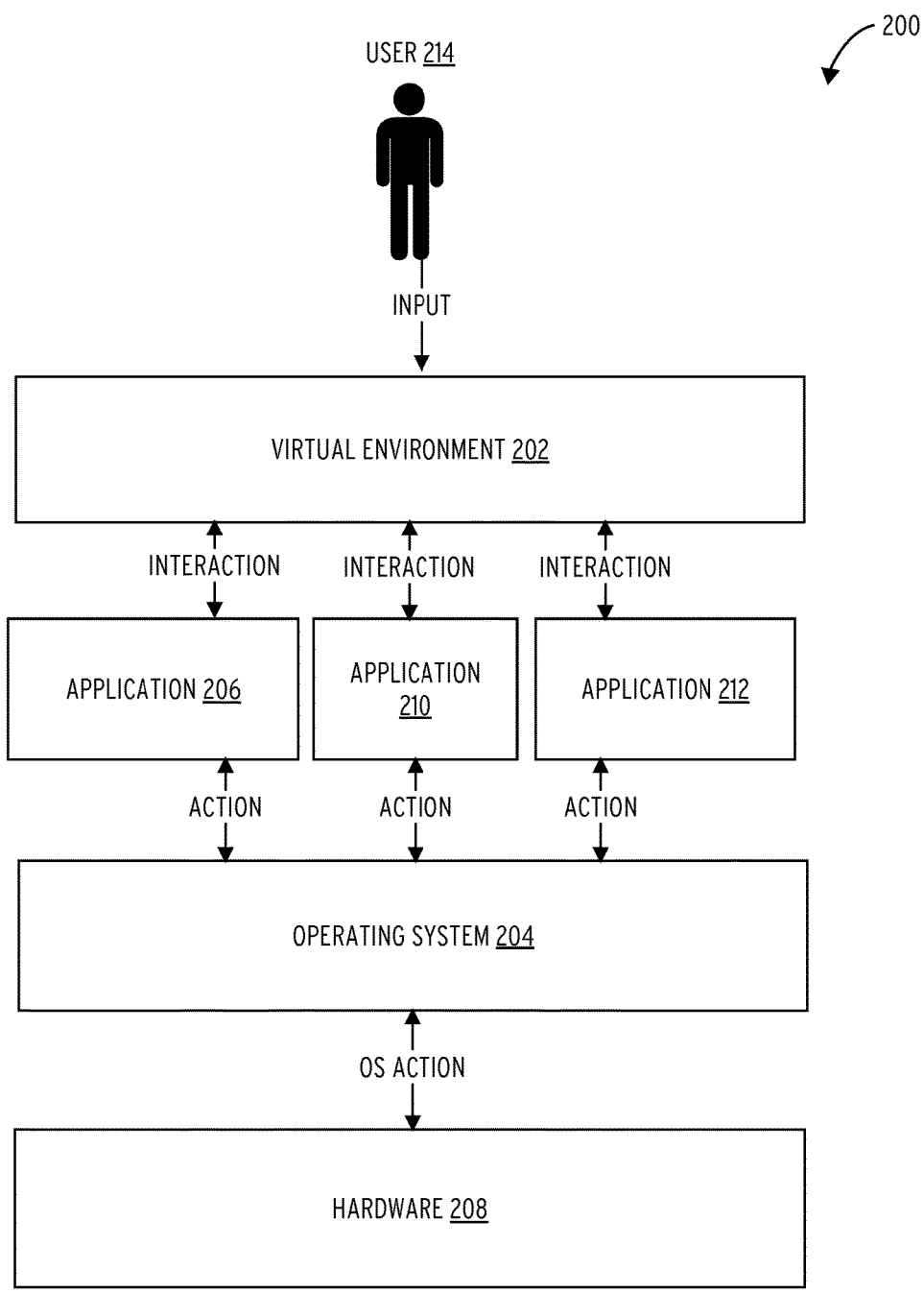
FIG. 2 illustrates a system for generating and operating a machine application interface for influencing a virtual environment 200 in accordance with one embodiment.
Figure 3:
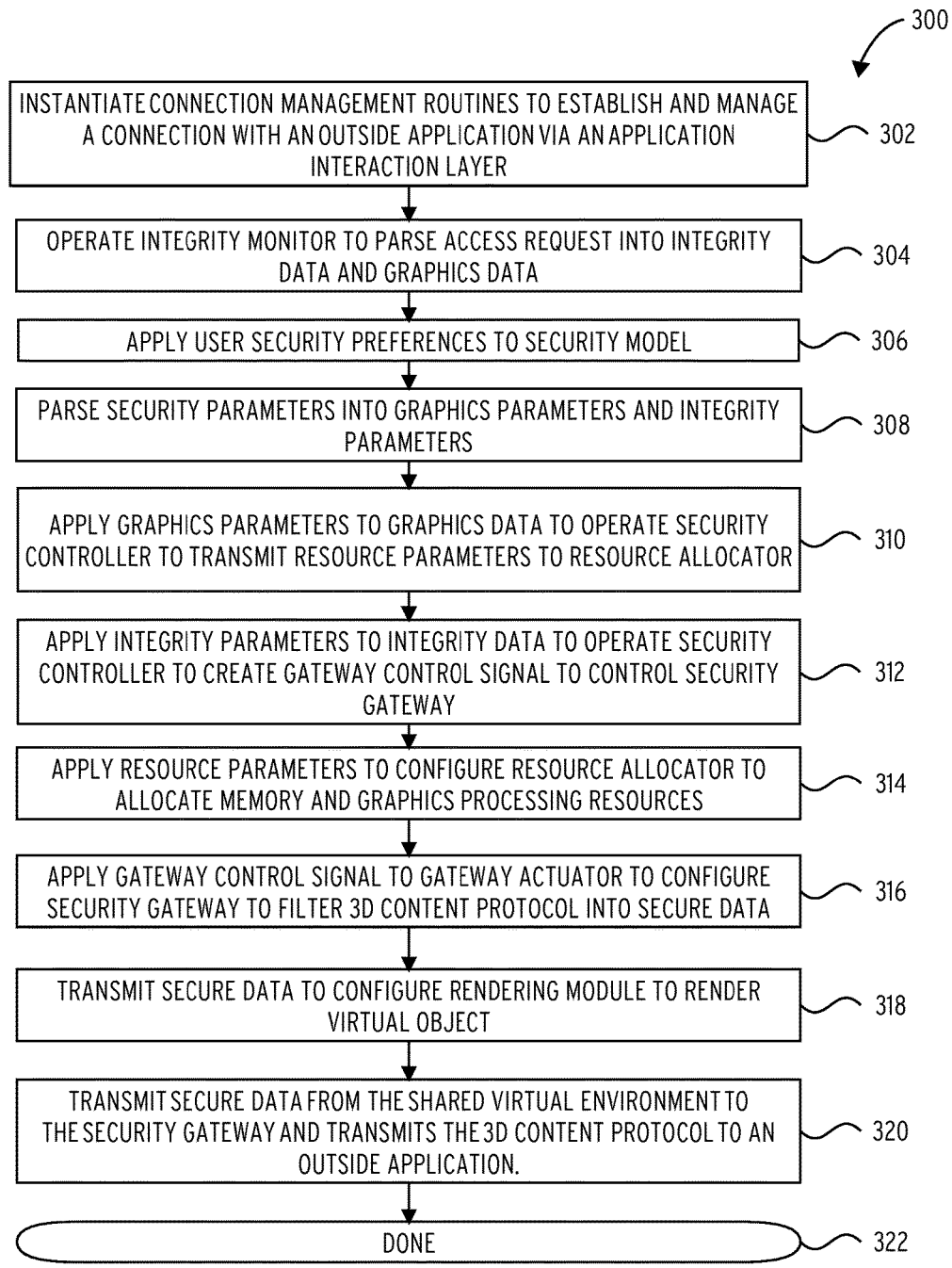
FIG. 3 illustrates a process for generating and operating a machine application interface for influencing a virtual environment 300 in accordance with one embodiment.

FIG. 2 illustrates a system for generating and operating a machine application interface for influencing a virtual environment 200 in accordance with one embodiment.

Virtual environment 202 receives input from user 214 and in response sends an interaction to application 206, application 210 or application 212. Application 206 sends an action to operating system 204 and in response operating system 204 sends an OS Action to hardware 208. Application 210 sends an action to operating system 204 and in response operating system 204 sends an OS Action to hardware 208. Application 212 sends an action to operating system 204 and in response operating system 204 sends an OS Action to hardware 208. Hardware 208 receives OS Action and in response performs a task.

In block 302, process for generating and operating a machine application interface for influencing a virtual environment 300 instantiate connection management routines to establish and manage a connection with an outside application via an application interaction layer.

In block 304, process for generating and operating a machine application interface for influencing a virtual environment 300 operates an integrity monitor to parse an access request into integrity data and graphics data.

In block 306, process for generating and operating a machine application interface for influencing a virtual environment 300 applies user security preferences to a security model.

In block 308, process for generating and operating a machine application interface for influencing a virtual environment 300 parses security parameters into graphics parameters and integrity parameters.

In block 310, process for generating and operating a machine application interface for influencing a virtual environment 300 applies the graphics parameters to the graphics data to operate a security controller to transmit resource parameters to a resource allocator.

In block 312, process for generating and operating a machine application interface for influencing a virtual environment 300 applies the integrity parameters to the integrity data to operate the security controller to create a gateway control signal to control a security gateway.

In block 314, process for generating and operating a machine application interface for influencing a virtual environment 300 applies the resource parameters to configure the resource allocator to allocate memory and graphics processing resources.

In block 316, process for generating and operating a machine application interface for influencing a virtual environment 300 applies the gateway control signal to a gateway actuator to configure the security gateway to filter a 3D content protocol into a secure data.

In block 318, process for generating and operating a machine application interface for influencing a virtual environment 300 transmits the secure data to configure a rendering module to render a virtual object.

In block 320, process for generating and operating a machine application interface for influencing a virtual environment 300 transmit secure data from the virtual environment to the security gateway and transmits the 3D content protocol to an outside application.

In done block 322, process for generating and operating a machine application interface for influencing a virtual environment 300 ends.

In some embodiments, a method may include instantiating connection management routines to establish and manage a connection with an outside application via an application interaction layer. The method may operate an integrity monitor to parse an access request into integrity data and graphics data, applying user security preferences to a security model, parsing security parameters into graphics parameters and integrity parameters, and applying the graphics parameters to the graphics data to operate a security controller to transmit resource parameters to a resource allocator. The method may apply the integrity parameters to the integrity data to operate the security controller to create a gateway control signal to control a security gateway. The method may configure the resource allocator with the resource parameters to allocate memory and graphics processing resources. The method may apply the gateway control signal to a gateway actuator to configure the security gateway to filter 3D content protocol into secure data, transmitting the secure data to a virtual environment to configure a rendering module to render a virtual object, and transmitting the secure data from the virtual environment to the security gateway and transmitting the 3D content protocol to the outside application. The method may configure the security gateway to filter the 3D content protocol into the secure data and may further include standardizing the 3D geometry of the 3D content protocol and standardizing the application frame rate of the 3D content protocol by frame removal or interpolation.

In further embodiments, the secure data and the 3D content protocols are exchanged asynchronously.

Configuring the security gateway to filter the 3D content protocol into the secure data may further include standardizing the 3D geometry of the 3D content protocol and standardizing the application frame rate of the 3D content protocol by frame removal or interpolation.

Such a method, applying the graphics parameters to the graphics data and applying the integrity parameters to the integrity data may further include transforming the integrity data and the graphics data that are in conflict with the integrity parameters and the graphics parameters into an override alert and transmitting the override alert to a user interface.

In some embodiments, the secure data may be encapsulated from surrounding data, the secure data may further include data structures, threads and connections. The connection management routines may include internal server applications, and internal client applications. Applying the graphics parameters to the graphics data may further include calculating rendering costs of the graphics data. The access request may further include an interaction from the outside application, and said interaction may request to alter the virtual object.

The process for generating and operating a machine application interface for influencing a virtual environment 300 improves the efficiency and operation of a system operating a virtual environment by implementing an asynchronous bidirectional protocol. This allows the system to interact with event-driven applications, while maintaining system and environment integrity, and ensuring that the system does not hang while waiting for communications from outside applications. This approach also frees up computer resources which may have otherwise been devoted to instantiating objects from failed connections to outside applications. This approach also solves an issue created by standard computing and virtual reality, namely that this method and system allows for the multitasking and interface of legacy two-dimensional event-driven programs with a virtual reality-based, real-time environment.

The aspect of a system for generating and operating a machine application interface for influencing a virtual environment 400 comprises application interaction layer 104, outside application 102, connection management routines 404, local application 106, connection management routines 406, local application 128, and connection management routines 408.

Figure 5:
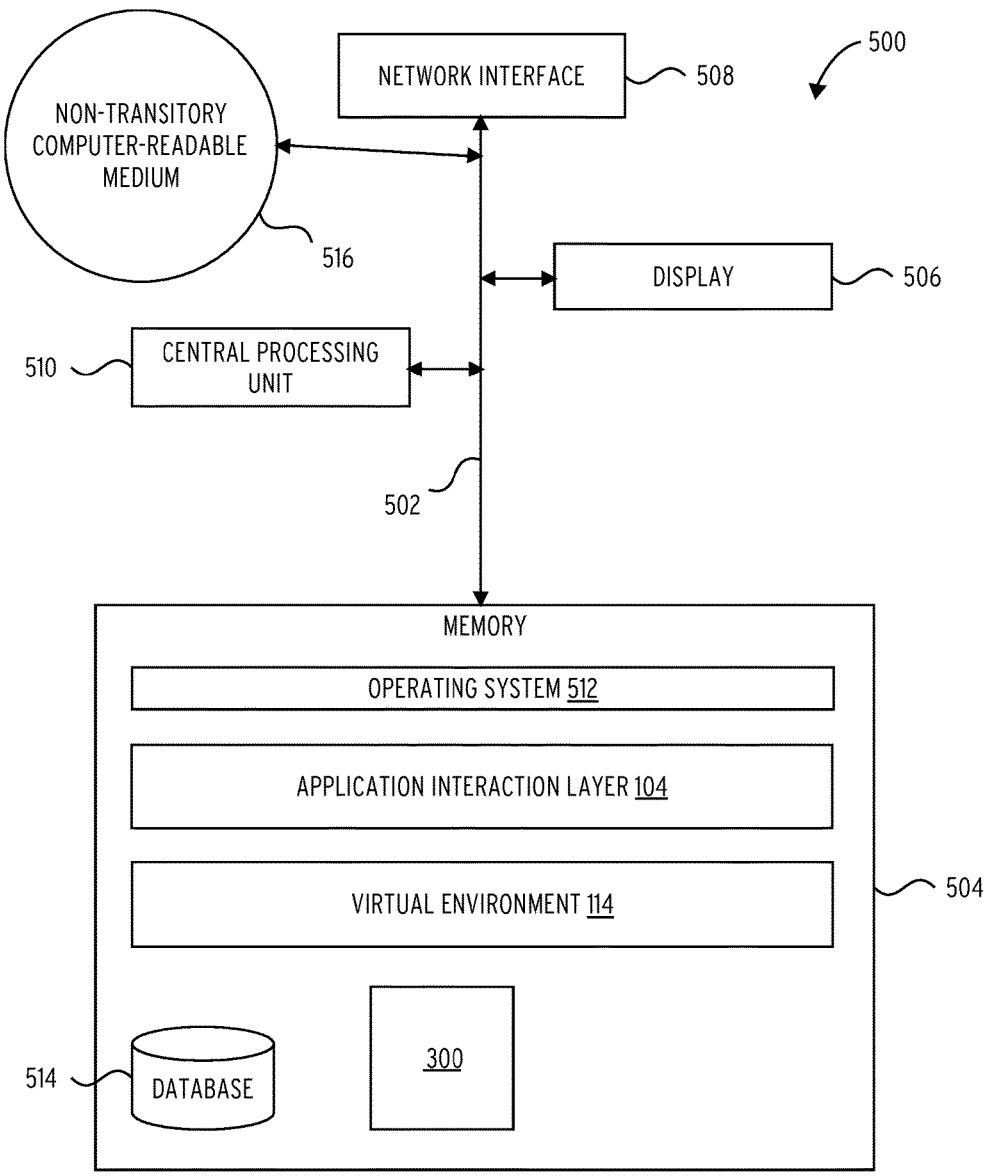
FIG. 5 illustrates an aspect of a system for generating and operating a machine application interface for influencing a virtual environment 500 in accordance with one embodiment.

FIG. 5 illustrates several components of an exemplary system for generating and operating a machine application interface for influencing a virtual environment 500 in accordance with one embodiment. In various embodiments, system for generating and operating a machine application interface for influencing a virtual environment 500 may include a desktop PC, server, workstation, mobile phone, laptop, tablet, set-top box, appliance, or other computing device that is capable of performing operations such as those described herein. In some embodiments, system for generating and operating a machine application interface for influencing a virtual environment 500 may include many more components than those shown in FIG. 5. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system for generating and operating a machine application interface for influencing a virtual environment 500 may comprise one or more physical and/or logical devices that collectively provide the functionalities described herein. In some embodiments, system for generating and operating a machine application interface for influencing a virtual environment 500 may comprise one or more replicated and/or distributed physical or logical devices.

In some embodiments, system for generating and operating a machine application interface for influencing a virtual environment 500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System for generating and operating a machine application interface for influencing a virtual environment 500 includes a bus 502 interconnecting several components including a network interface 508, a display 506, a central processing unit 510, and a memory 504.

Memory 504 generally comprises a random access memory ("RAM") and permanent non-transitory mass storage device, such as a hard disk drive or solid-state drive. Memory 504 stores an operating system 512.

These and other software components may be loaded into memory 504 of system for generating and operating a machine application interface for influencing a virtual environment 500 using a drive mechanism (not shown) associated with a non-transitory computer-readable medium 516, such as a floppy disc, tape, DVD/CD-ROM drive, memory card, or the like.

Memory 504 also includes database 514. In some embodiments, system for generating and operating a machine application interface for influencing a virtual environment 500 may communicate with database 514 via network interface 508, a storage area network ("SAN"), a high-speed serial bus, and/or via the other suitable communication technology.

In some embodiments, database 514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A method comprising:
   instantiating connection management routines to establish and manage a connection with an outside application via an application interaction layer;
   operating an integrity monitor to parse an access request into integrity data and graphics data;
   applying user security preferences to a security model;
   applying graphics parameters of the security preferences to the graphics data to operate a security controller to transmit resource parameters to a resource allocator;
   applying integrity parameters of the security preferences to the integrity data to operate the security controller to create a gateway control signal to control a security gateway;
   configuring the resource allocator with the resource parameters to allocate memory and graphics processing resources;
   applying the gateway control signal to a gateway actuator to configure the security gateway to filter 3D content protocol into secure data;
   transmitting the secure data to a virtual environment to configure a rendering module to render a virtual object; and
   transmitting the secure data from the virtual environment to the security gateway and transmitting the 3D content protocol to the outside application.

2. The method of claim 1, wherein the secure data and the 3D content protocols are exchanged asynchronously.

3. The method of claim 1, wherein configuring the security gateway to filter the 3D content protocol into the secure data further comprises:
   standardizing the 3D content protocol's 3D geometry; and
   standardizing the 3D content protocol's application frame rate by frame removal or interpolation.

4. The method of claim 1, wherein applying the graphics parameters to the graphics data and applying the integrity parameters to the integrity data further comprises:
   transforming the integrity data and the graphics data that are in conflict with the integrity parameters and the graphics parameters into an override alert; and
   transmitting the override alert to a user interface.

5. The method of claim 1, wherein the secure data is encapsulated from surrounding data.

6. The method of claim 1, wherein the secure data further comprises data structures, threads and connections.

7. The method of claim 1, wherein the connection management routines further comprise an internal server application, and internal client application.

8. The method of claim 1, wherein applying the graphics parameters to the graphics data further comprises calculating rendering costs of the graphics data.

9. The method of claim 1, wherein the access request further comprises an interaction from the outside application.

10. The method of claim 9 wherein the interaction requests an alteration of the virtual object.

11. A non-transitory computer-readable storage medium, the computer-readable storage medium including instructions that when executed by a computer, cause the computer to:
   instantiate connection management routines to establish and manage a connection with an outside application via an application interaction layer;
   operate an integrity monitor to parse an access request into integrity data and graphics data;
   apply user security preferences to a security model;
   apply graphics parameters of the security preferences to the graphics data to operate a security controller to transmit resource parameters to a resource allocator;
   apply integrity parameters of the security preferences to the integrity data to operate the security controller to create a gateway control signal to control a security gateway;
   configure the resource allocator with the resource parameters to allocate memory and graphics processing resources;
   apply the gateway control signal to a gateway actuator to configure the security gateway to filter 3D content protocol into secure data;
   transmit the secure data to a virtual environment to configure a rendering module to render a virtual object; and
   transmit the secure data from the virtual environment to the security gateway and
   transmitting the 3D content protocol to the outside application.

12. The computer-readable storage medium of claim 11, wherein the secure data and the 3D content protocols are exchanged asynchronously.

13. The computer-readable storage medium of claim 11, wherein configuring the security gateway to filter the 3D content protocol into the secure data further comprises:
   standardizing the 3D content protocol's 3D geometry; and
   standardizing the 3D content protocol's application frame rate by frame removal or interpolation.

14. The computer-readable storage medium of claim 11, wherein applying the graphics parameters to the graphics data and applying the integrity parameters to the integrity data further comprises:
   transforming the integrity data and the graphics data that are in conflict with the integrity parameters and the graphics parameters into an override alert; and
   transmitting the override alert to a user interface.

15. The computer-readable storage medium of claim 11, wherein the secure data is encapsulated from surrounding data.

16. The computer-readable storage medium of claim 11, wherein the secure data further comprises data structures, threads and connections.

17. The computer-readable storage medium of claim 11, wherein the connection management routines further comprise an internal server application, and an internal client application.

18. The computer-readable storage medium of claim 11, wherein applying the graphics parameters to the graphics data further comprises calculating rendering costs of the graphics data.

19. The computer-readable storage medium of claim 11, wherein the access request further comprises an interaction from the outside application.

20. The computer-readable storage medium of claim 19 wherein the interaction requests an alteration of the virtual object.

* * * * *